United States Patent [19]

Ishikawa et al.

[11] Patent Number: 5,248,990
[45] Date of Patent: Sep. 28, 1993

[54] PROCESS FOR PRODUCING OPTICAL RECORDING MEDIUM FOR OPTICAL DATA RECORDING AND REPRODUCTION

[75] Inventors: Nobuyuki Ishikawa; Hiroshi Kohno, both of Yokohama; Yoshihide Kamei, Kamakura, all of Japan

[73] Assignee: Canon Kabushiki Kaisha, Tokyo, Japan

[21] Appl. No.: 887,597

[22] Filed: May 21, 1992

Related U.S. Application Data

[63] Continuation of Ser. No. 544,018, Jun. 28, 1990, abandoned, which is a continuation of Ser. No. 182,228, Apr. 15, 1988, abandoned.

[30] Foreign Application Priority Data

| Apr. 16, 1987 | [JP] | Japan | 61-092087 |
| Apr. 27, 1987 | [JP] | Japan | 61-101814 |
| Apr. 30, 1987 | [JP] | Japan | 61-104676 |
| Jun. 5, 1987 | [JP] | Japan | 61-140083 |

[51] Int. Cl.$^5$ .................. G11B 7/007; G01D 15/14
[52] U.S. Cl. .................. 346/1.1; 346/76 L; 346/135.1; 369/275.3; 430/945
[58] Field of Search .............. 346/1.1, 76 L, 108, 346/135.1, 137; 369/275.3, 275.4; 430/945

[56] References Cited

U.S. PATENT DOCUMENTS

| 3,438,050 | 4/1969 | Aschenbrenner | 346/108 X |
| 3,875,024 | 4/1975 | Picquendar | 369/109 X |
| 3,902,010 | 8/1975 | Goshima | 369/111 X |
| 4,069,487 | 1/1978 | Kasai | 346/76 L |
| 4,139,853 | 2/1979 | Ghekiere | 346/76 L X |
| 4,278,756 | 7/1981 | Bouldin | 346/76 L X |
| 4,412,231 | 10/1983 | Namba | 346/135.1 |
| 4,428,075 | 1/1984 | Hazel | 346/76 L X |
| 4,466,091 | 8/1984 | Takagi | 369/275 |
| 4,513,407 | 4/1985 | Bricot | 369/111 X |
| 4,707,425 | 11/1987 | Sasagawa | 430/945 X |
| 4,707,430 | 11/1987 | Ozawa | 430/945 X |
| 4,954,380 | 9/1990 | Kanome | 346/76 L X |
| 4,965,153 | 10/1990 | Imataki | 430/11 |

FOREIGN PATENT DOCUMENTS

| 0108258 | 10/1983 | European Pat. Off. |
| 2405385 | 8/1974 | Fed. Rep. of Germany |
| 2531562 | 2/1976 | Fed. Rep. of Germany |
| 2747433 | 4/1978 | Fed. Rep. of Germany |
| 114340 | 7/1983 | Japan |
| 207039 | 11/1984 | Japan |
| 227253 | 11/1985 | Japan |
| 02969 | 9/1982 | PCT Int'l Appl. |
| 1464442 | 2/1977 | United Kingdom |
| 1522951 | 8/1978 | United Kingdom |
| 1594458 | 7/1981 | United Kingdom |

OTHER PUBLICATIONS

Japanese Patent Abstracts, vol. 7, No. 196 (P-219) 58-94149.
Zech, Review of Optical Storage Media, SPIE, vol. 177 (1979) pp. 56:63.
Sears, University Physics, Chapter 42 (1977) pp. 707:18.
R. Bartolini, Optical Storage Materials and Methods, 123 Optical Recording Media Review, at 2-9 (1977).

*Primary Examiner*—Joseph W. Hartary
*Attorney, Agent, or Firm*—Fitzpatrick, Cella, Harper & Scinto

[57] ABSTRACT

An optical recording medium for optical data recording and reproduction is produced through a process including the steps of forming an optical recording layer comprising an organic film on a substrate and irradiating the organic film with laser light to scatter the irradiated portion of the organic film, thus forming a tracking groove thereat and leaving an optical recording part along the tracking groove. The thus formed optical recording part and tracking groove provide a high reflectivity ratio or a high reflective contrast, whereby a good tracking fidelity is ensured during the optical recording and reproduction.

16 Claims, 7 Drawing Sheets

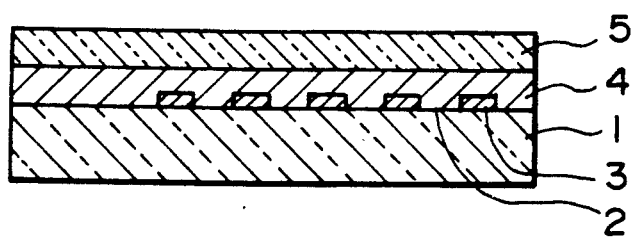
F I G. 1
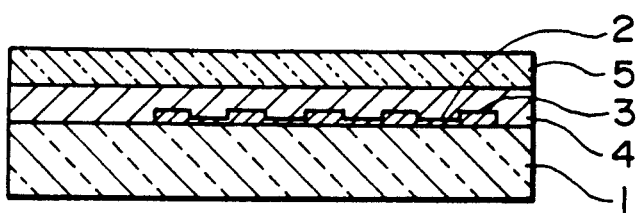
F I G. 2
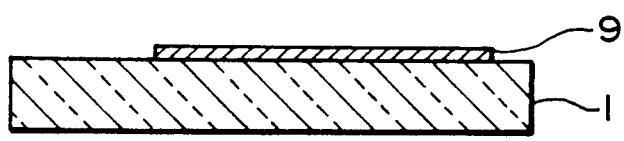
F I G. 3A
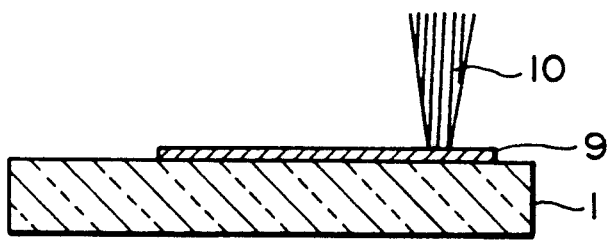
F I G. 3B

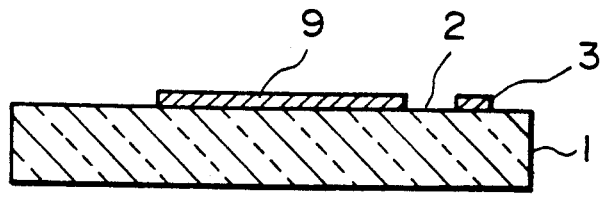
F I G. 3C
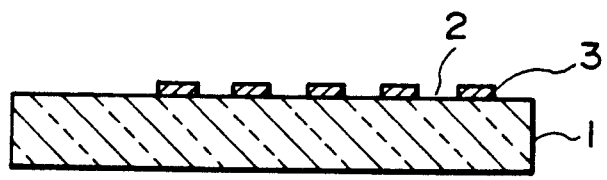
F I G. 3D
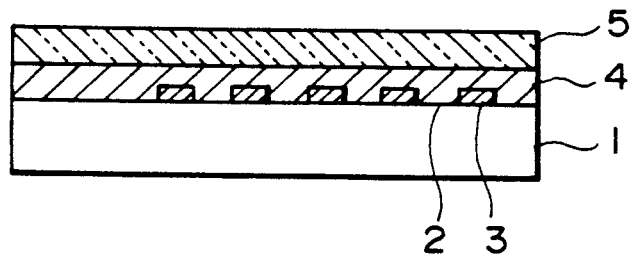
F I G. 3E
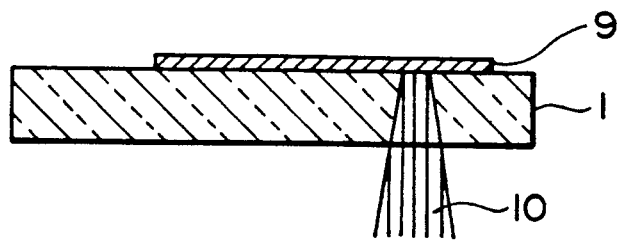
F I G. 3F

F I G. 5A
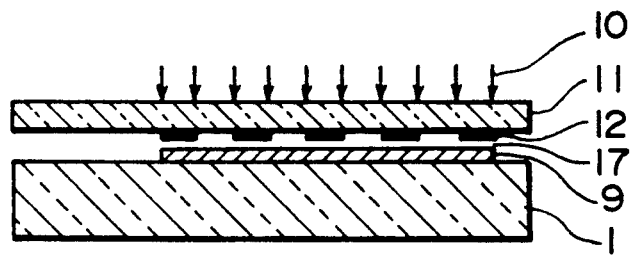
F I G. 5B(1)
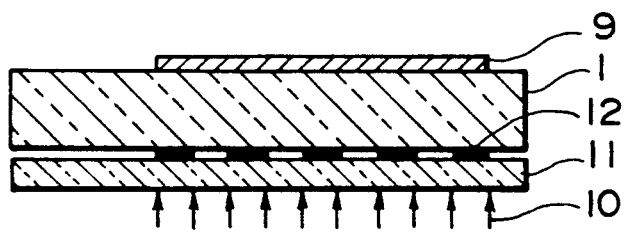
F I G. 5B(2)
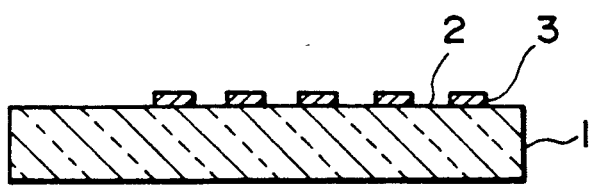
F I G. 5C

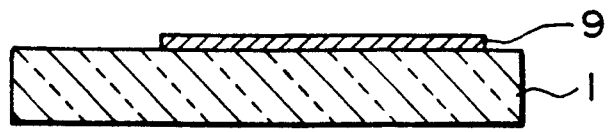
F I G. 8A
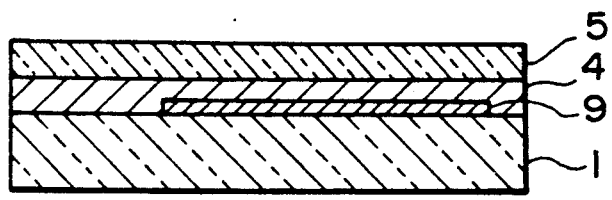
F I G. 8B
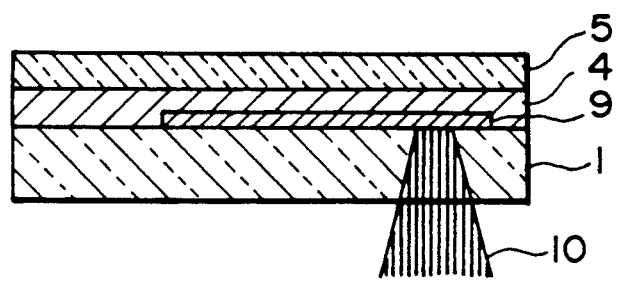
F I G. 8C(1)
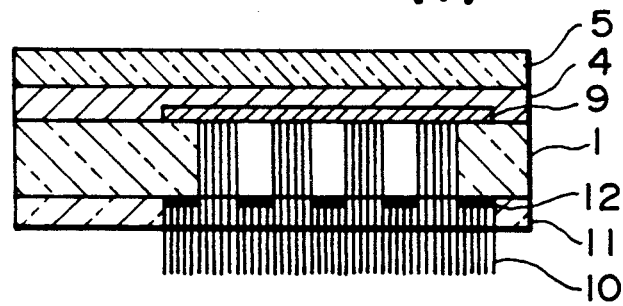
F I G. 8C(2)
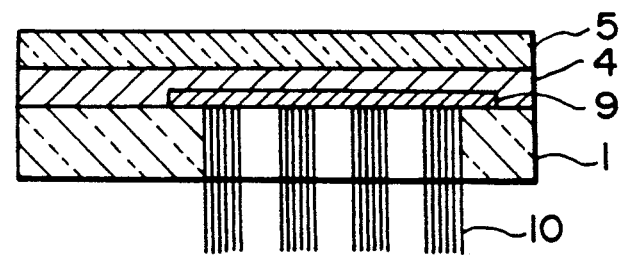
F I G. 8C(3)

PROCESS FOR PRODUCING OPTICAL RECORDING MEDIUM FOR OPTICAL DATA RECORDING AND REPRODUCTION

This application is a continuation of application Ser. No. 07/544,018 filed Jun. 28, 1990; which is a continuation of application Ser. No. 07/182,228 filed Apr. 15, 1988, both now abandoned.

FIELD OF THE INVENTION AND RELATED ART

The present invention relates to a process for producing an optical recording medium for optical data recording and reproduction.

In recent years, as the size of information circulated in the world increases, many proposals have been made about optical recording media for recording and reproduction of optical data, such as optical disks, optical cards and optical tapes as effective means for processing a wide variety of data. Among such optical recording media, there is known a type wherein binary-coded data are recorded and detected as a change in reflectivity or change in surface shape, such as presence or absence of pits, yielding a change in reflected light intensity.

As an optical recording medium utilizing a change in optical reflectivity, there has been proposed a so-called heat-mode recording material wherein the recording layer is irradiated with spots of an energy beam such as a laser beam to cause a local state change in the layer. This type of recording material is a so-called "DRAW (direct read after write)" medium which does not require a post treatment, such as development, after writing of data but can be directly read after writing, and is further capable of high density recording and also additional writing.

For such optical recording media, a system of forming grooves at a certain interval on the surface of a substrate as tracking servo guides for writing and reading is known. In this system, as the grooves function as guides for writing and reading, the tracking control accuracy of a laser beam is improved and a higher access speed can be accomplished than the conventional system using a substrate with no such guide grooves.

As a method of forming guide grooves on a substrate, a method of thermally transferring a stamper pattern by injection molding or hot pressing at a temperature above the melting point of a thermoplastic resin is known in case where the substrate is composed of such a thermoplastic resin, and also known is a method wherein a photosetting resin composition is applied onto a substrate and is cured under irradiation with ultraviolet rays, etc. and in contact with a stamper to photo-transfer the stamper pattern.

FIG. 9 is a schematic sectional view of a conventional optical recording medium in the form of a card, which comprises a substrate 6 having tracking patterns 7, an adhesive layer 4, and a base 5. The optical recording medium is used for recording and reproduction of data by writing and readout by means of the substrate 6 and the track 7.

In the case of the above-mentioned thermal transfer, the track 7 is integral with and made of the same material as the substrate 6. On the other hand, in the case of the phototransfer, the track 7 is not made of the same material as but is bonded to the substrate 6. In any case, the substrate 6 is preliminarily provided with tracking grooves so as to allow tracking by phase lag of a laser beam through utilization of the fine unevenness pattern.

Such an optical recording medium has a structure comprising an optical recording layer formed on an uneven surface, so that the production thereof requires formation of an unevenness pattern on the substrate first of all. The conventional transfer process using a stamper involves several problems with respect to the yield of transfer of a stamper pattern, transfer time, and the durability and cost of the stamper affecting the productivity and production cost of the optical recording medium.

Further, as the recording sensitivity of the optical recording layer depends on the thickness of the layer, it is necessary to form the optical recording layer in a uniform thickness. However, as the optical recording layer was conventionally formed on an uneven substrate surface, it was difficult to form the layer in a uniform thickness. Further, the groove pattern was not well reproduced on the optical recording layer, so that a good tracking signal could not be obtained.

A method of forming servo guides without using a stamper has been disclosed in U.S. Pat. No. 4,278,756, wherein a film of silver halide emulsion formed on a substrate is exposed in a servo guide pattern through a mask or by means of a laser photographic recording beam, followed by chemical or direct development, to form low reflectivity servo guides. However, when this method is applied to an optical recording layer comprising an organic film, however, the organic compound constituting the organic film is decomposed or denaturated by the developing agent through reduction of, e.g., unsaturated bonds in the organic bond by the reducing function of the developing agent, thus resulting in decrease or loss of laser beam-absorbing capacity of the organic compound attributable to the unsaturated bonds.

SUMMARY OF THE INVENTION

An object of the present invention is to provide a process for producing an optical recording medium having an optical recording layer of an organic film which is capable of forming a tracking groove without using a stamper.

Another object of the present invention is to provide a process for producing an optical recording medium capable of producing a high-quality tracking signal.

A further object of the present invention is to provide a process for producing an optical recording medium, which comprises simplar steps than the conventional processes.

According to the present invention, there is provided a process for producing an optical recording medium, which comprises forming an optical recording layer comprising an organic film on a substrate, and irradiating the organic film with laser light to scatter the irradiated portion of the organic film, thus forming a tracking groove thereat and leaving an optical recording part along the tracking groove.

According to the process of the invention, a tracking groove may be formed without a developing treatment after the irradiation with the laser beam, so that an optical recording medium of an organic film may be provided with a tracking groove without using a stamper and a good tracking signal may be obtained. Such a good tracking signal may be obtained presumably because of a large difference in reflectivity between the optical recording part (track) and tracking groove, a phase difference in reflected light, and a combined effect of these.

These and other objects, features and advantages of the present invention will become more apparent upon a consideration of the following description of the preferred embodiments of the present invention taken in conjunction with the accompanying drawings, wherein like parts are denoted by like reference numerals.

BRIEF DESCRIPTION OF THE DRAWINGS

FIGS. 1 and 2 are schematic sectional views each illustrating an optical recording medium obtained by an embodiment of the process of the invention;

FIGS. 3A-3F, FIGS. 4A-4C, FIGS. 5A-5C, FIGS. 6A-6E, and FIGS. 8A-8C (8C(1)-8C(3)), respectively, schematic sectional views for illustrating an embodiment of the invention;

DETAILED DESCRIPTION THE INVENTION

Referring to FIGS. 1 and 2 each showing an optical recording medium obtained by an embodiment of the invention, each optical recording medium comprises a substrate 1, tracking grooves 2, optical recording parts (tracks) 3, an adhesive layer 4, and a base 5.

Figure 10:
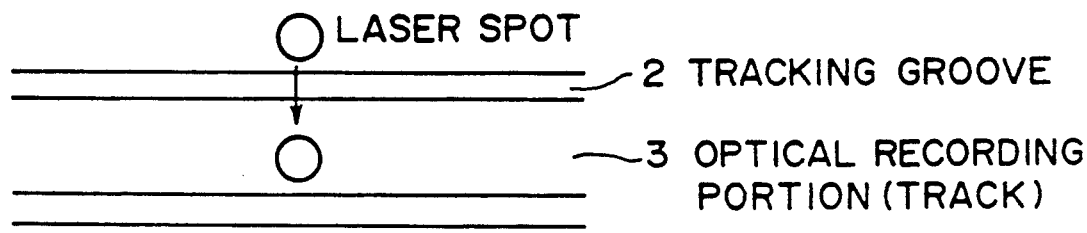
FIG. 10 is a schematic plan view illustrating laser spot scanning for measurement of a reflective contrast between the recording portion (track) and the tracking groove.
Figure 11:
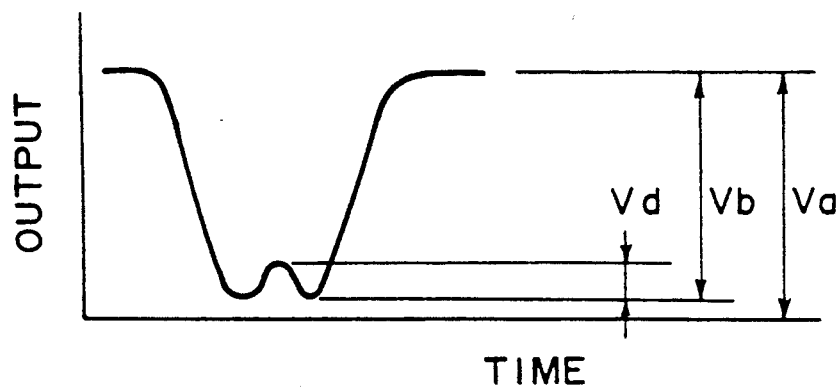
FIG. 11 is a diagram showing a change in output as a result of the measurement.

A tracking groove 2 may preferably have a width of 2-4 $\mu$m, and an optical recording part 3 may preferably have a width of 3-10$\mu$. It is preferred that the tracking groove 2 is substantially free of the organic film constituting the optical recording part (as shown in FIG. 1) or only with a slightly remaining film after scattering (as shown in FIG. 2) such that it provides a difference in reflectivity satisfying the relationship of $0.3 \leq (R(d_1) - R(d_2))/R(d_1) \leq 0.7$, wherein $R(d_1)$ denotes the reflectivity at the optical recording part and $R(d_2)$ denotes the reflectivity at the tracking groove, in order to obtain a good tracking signal. At this time, it is preferred that the tracking groove 2 and the optical recording part 3 provide a reflective contrast of 0.45 or above. Herein, the reflective contrast is measured by using an ordinary optical readout system (e.g., one including a semiconductor laser of 830 nm at a power of 0.27 mW) and scanning an optical recording medium across a tracking groove with a laser beam spot (of, e.g., 3 $\mu$m diameter) as shown in FIG. 10 and calculating the contrast according to the following definition based on a reflected light quantity curve as shown in FIG. 11 detected by an oscilloscope connected to the readout system:

Reflective contrast = $Vb/Va$.

Next, the process of the present invention for producing an optical recording medium with a patterned optical recording part will be explained with reference to embodiments shown in the Figures.

FIGS. 3A-3E illustrate an embodiment of the invention wherein an optical recording layer 9 formed on a substrate 1 is irradiated with a scanning laser beam 10 condensed or focused to a tracking groove width. More specifically, an organic film 9 constituting an optical recording layer is formed on a substrate 1 (FIG. 3A). Then, the organic film 9 is irradiated with scanning laser light 10 having a wavelength absorbable by the organic film and condensed to a desired tracking groove width (FIG. 3B), thereby to form a tracking groove 2 (FIG. 3C) by scattering of the irradiated portion of the organic film. The above steps are repeated to form tracking grooves 2 at a certain spacing corresponding to the width of an optical recording part 3, thus providing a patterned optical recording layer 3 (FIG. 3D). Alternatively, the irradiation of the organic film 9 with laser light 10 can be effected through the substrate 1 as shown in FIG. 3F.

Then, a base member 5 for reinforcement and easiness of handling is applied by the medium of an adhesive layer 4 to form an optical recording medium as shown in FIG. 3E, which is substantially the same as the one shown in FIG. 1.

Figure 4A:
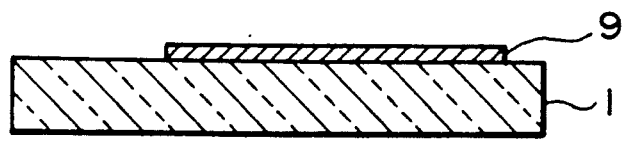
Figure 4B:
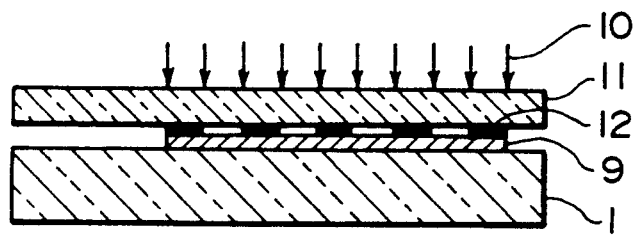
Figure 4C:
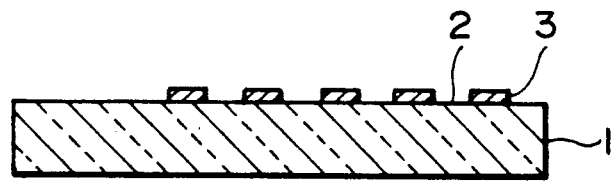

FIGS. 4A-4C illustrate another embodiment of forming a patterned optical recording layer, wherein an optical recording layer formed on a substrate is irradiated with laser light through a mask disposed in contact with the optical recording layer. More specifically, an organic film 9 formed as an optical recording layer on a substrate 1 (FIG. 4A) is irradiated with laser light 10 having a wavelength absorbable by the organic film 9 through a mask comprising a mask substrate 11 and a mask pattern 12 simultaneously over a desired area (FIG. 4B), thereby to scatter the irradiated portion to leave the masked portion as the optical recording part 3 (FIG. 4C). According to an embodiment shown in FIGS. 4A-4C wherein the irradiation is effected through a mask in contact with an optical recording layer, the optical recording layer can be patterned at a high resolution.

Alternatively, an optical recording layer 9 on a substrate 1 can be irradiated with laser light 10 through a mask disposed with a certain spacing 17 from the optical recording layer 9 (FIG. 5B(1)) or through a mask disposed in contact with a side of the substrate 1 opposite to the side on which the optical recording layer 9 is formed.

FIGS. 6A-6E show another embodiment of the process for producing an optical recording medium having a patterned optical recording layer on a substrate.

Figure 6A:
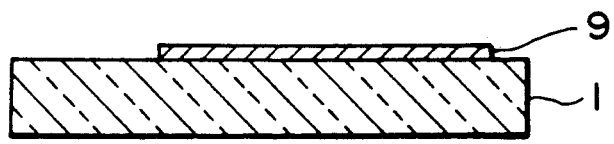
Figure 6B:
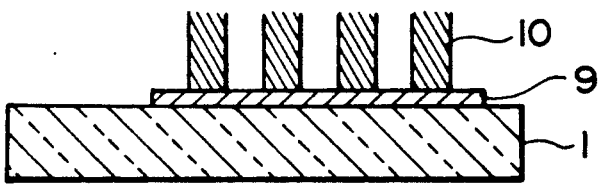
Figure 6C:
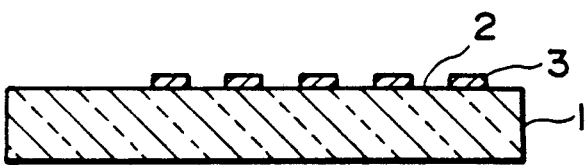

More specifically, an organic film 9 formed on a substrate 1 (FIG. 6A) is irradiated with laser light 10 having a wavelength absorbable by the organic film and patterned in stripes according to an optical interference method (FIG. 6B), thereby to scatter the irradiated portion to form tracking grooves 2 and leave the masked portion as an optical recording part 3 (FIG. 6C). The width of scattering of the irradiated portion of the organic film is determined depending on the intensity of the laser light and the sensitivity of the organic film.

Figure 7:
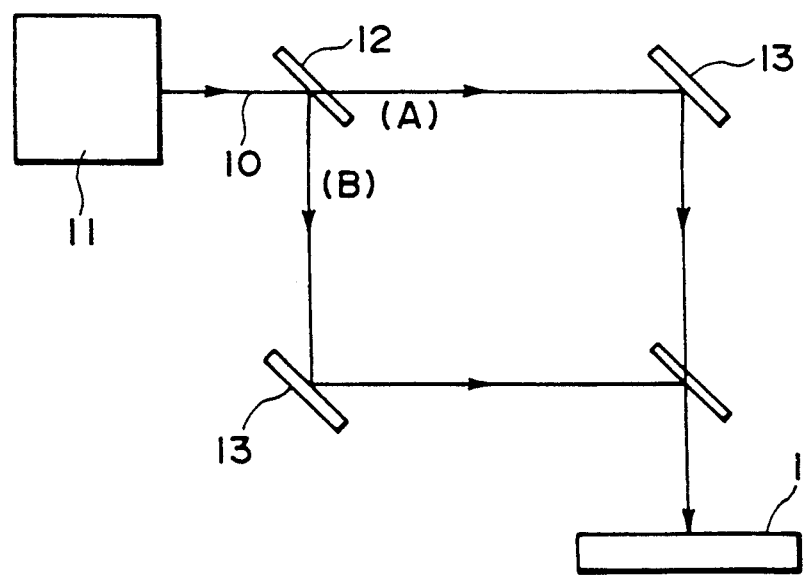
Figure 9:
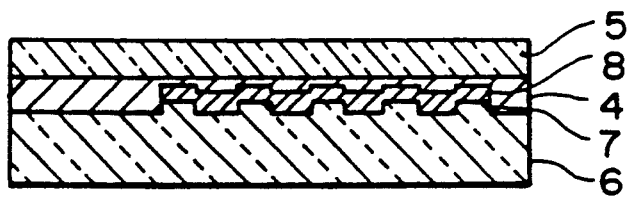
FIG. 9 is a schematic sectional view of an optical recording medium obtained by a conventional process.

The pattern formation according to the optical interference method in the present invention may be effected by means of various optical systems. FIG. 7 illustrates an example of such a system for interference of laser light. Referring to FIG. 7, laser light 10 emitted from a laser source 11 is split by means of a half mirror (beam splitter) 12 into two fluxes along optical paths A and B. The fluxes A and B are then respectively reflected by mirrors 13 and then incident on a recording layer (not shown) on a substrate 1, where interference fringes are formed due to interference between the two fluxes. At this time, the angle of intersection of the fluxes A and B can be varied by changing the angles of the mirrors 13, so that the pitch of the interference fringes formed on the recording layer is changed. More specifically, the pitch of the interference fringes is determined by the angles of incidence of the fluxes A and B on the substrate 1 and can be controlled as desired.

The light intensity distribution of the interference fringes forms a sine curve. As a result, the portions of the optical recording layer receiving a photo-energy exceeding a certain level required for scattering are determined by intersections of the sine curve and the energy level. Thus, the line width, i.e., the width of the tracking groove, is governed by the intensity distribution of the interference fringes given by the laser energy.

Figure 6D:
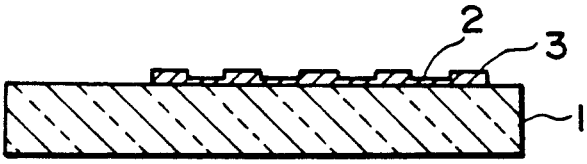
Figure 6E:
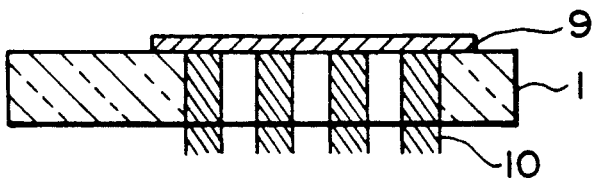

In the embodiment using the interference method as explained above, it is also possible to irradiate the organic film 9 through the substrate 1 with such patterned laser light as shown in FIG. 6E. Further, it is also possible to leave some organic film at the tracking grooves 2 (FIG. 6D).

In the case of the groove (concavity) retaining an organic film, the groove itself can be used as an optical recording part and the convex portion of the optical recording layer can be used as a tracking guide by utilizing a phase difference.

After the formation of a patterned optical recording layer 3 on a substrate 1 as shown in FIG. 4C, 5C, 6C or 6D, a base member 5 is applied on the optical recording layer 3 by the medium of an adhesive layer 4 to form an optical recording medium as shown in FIG. 1 or FIG. 2 according to the present invention.

Alternatively, it is also possible to first form an organic film 9 on a substrate 1 (FIG. 8A), bond it to a base 5 by the medium of an adhesive layer 4 (FIG. 8B) and then apply the above-mentioned various methods of irradiation of the organic film 9 with laser light 10 for providing a patterned optical recording layer on the substrate 1 as shown in FIGS. 8C(1)–8C(3). At this time, it is desirable to irradiate the organic film 9 from the side of the substrate 1 not having thereon the organic film 9 so that a patterned film can be formed at a good resolution with few interfaces causing possible reflection or refraction of the laser light.

In the present invention including various embodiments as mentioned above, the organic film 9 may preferably comprise a material compatible with light for use optical recording and reproduction. For example, if the light beam for reproduction has a wavelength in the range of 650 nm–900 nm, the organic film 9 should preferably form pits as parts for recording data bits providing a large difference in reflectivity from that of un-recorded parts. Further, the organic film 9 is required to show absorption in the above-mentioned range. Further, it is preferred that the organic film 9 causes a change in reflectivity at a low energy irradiation for recording. It is further preferred that the organic film 9 does not readily cause a change in reflectivity at recording parts (pits, etc.) or unrecorded parts. The material constituting the organic film 9 may preferably form a solution or a dispersion adapted for continuous application in view of the productivity of the recording medium.

Examples of such a material for organic film 9 may include: anthraquinone derivatives (particularly those having an indanthrene skeleton), dioxadine and its derivatives, triphenodithiazine compounds, phenanthrene derivatives, cyanine compounds, merocyanine compounds, pyrylium compounds, xanthine compounds, triphenylmethane compounds, croconium dyes, azo dyes, crocones, azines, indigoids, methine dyes, azulenes, squarium derivatives, sulfide dyes, and metal dithiolate complexes.

Such a dye or colorant as described above can be used alone or mixed with an agent for quenching the dye in the excited state to form a dye composition. The quenching agent may be selected from the examples thereof described hereinbelow in consideration of the compatibility or solubility with the dye and the solvent. The quencher may be added in several wt. % to 50 wt. % of the dye. Too little quencher fails to show its effect sufficiently, and the addition in excess of 50 wt. % can lead to a decrease in sensitivity. For these reasons, it is preferred to use the quencher in a proportion of 10 wt. % to 30 wt. %, particularly around 20 wt. %, of the dye.

Examples of the quencher may include various metal chelate compounds, such as four coordination-type compounds having central atoms such as Zn, Cu, Ni, Cr, Co, Mn, Pd and Zr with polydentate ligands inclusive of tetra-dentate ligands such as $N_4$, $N_2O_2$, $N_2S_2$, $S_4$, $O_2S_2$ and $O_4$; a combination of tri-dentate ligands such as $NS_2$, $O_3$ and NOS with another ligand such as water, ammonia, halogen, phosphine, amine, arsine and olefin; or combination of bidentate ligands such as $N_2$, NO, $O_2$ and $S_2$; biscyclopentadienyl ligand, cyclopentadienyltropylinium ligand; or combination of the above. Examples of the quencher may further include various aromatic amines or diamines, nitrogen-containing aromatic compounds and their onium salts, such as aminium salt; diimmonium salt, pyridinium salt and quinolynium salt. The quencher may further be a pyrylium salt which is a salt of an oxygen-containing aromatic compound. These quenches can be used in combination of plural species in an appropriate composition variable in view of the coating characteristic of the resultant dye composition, and the stability, the optical characteristics (reflectivity and transmittance) and recording sensitivity of the coating film.

In order to improve the film property of the organic film, the dye or its composition can be used in combination with a binder wherein the dye is contained in a dispersion or an amorphous state (solid solution). The binder may be selected from a wide variety of resins. Examples of the binder may include cellulose esters such as nitrocellulose, cellulose phosphate, cellulose sulfate, cellulose acetate, cellulose propionate, cellulose butyrate, cellulose myristate, cellulose palmitate, cellulose acetate propionate, and cellulose acetate butyrate; cellulose ethers, such as methyl cellulose, ethyl cellulose, propyl cellulose, and butyl cellulose; vinyl resins, such as polystyrene, polyvinyl chloride, polyvinyl acetate, polyvinyl butyral, polyvinyl acetal, polyvinyl alcohol, and polyvinylpyrrolidone; copolymer resins, such as styrene-butadiene copolymer, styrene-acrylonitrile copolymer, styrene-butadiene-acrylonitrile copolymer, and vinyl chloride-vinyl acetate copolymer; acrylic resins, such as polymethyl methacrylate, polymethyl acrylate, polybutyl acrylate, polyacrylic acid, polymethacrylic acid, polyacrylamide, and polyacrylonitrile; polyesters, such as polyethylene terephthalate; polyacrylate resins, such as poly(4,4'-isopropylidene-diphenylene-co-1,4-cyclohexylenedimethylenecarbonate), poly(ethylenedioxy-3,3'-phenylene-thiocarbonate), poly(4,4'-isopropylideneisopropylidene-diphenylene-carbonate), poly(4,4'-secbutyridene-diphenylenecarbonate), poly(4,4'-isopropylidene-diphenylenecarbonate-block-oxyethylene); polyamides, polyimides, expoxy resins, phenolic resins, and polyolefins such as polyethylene, polypropylene, and chlorinated polyolefins.

Such a binder resin may preferably be used in a proportion of 10–90 wt. %, particularly 30–80 wt. %, of the dye or its composition.

When the organic film 9 is formed by coating, the dye or its composition may be dissolved in an organic solvent to form a coating composition. A particular organic solvent to be used can be different depending on the dye used, the kind of the binder when used, or whether the dye is contained in the binder in the form of a dispersion or amorphous state. However, examples of the organic solvent generally used for this purpose may include: alcohols, such as methanol, ethanol and isopropanols; ketones, such as acetone, methyl ethyl ketone and cyclohexanone; amides, such as N,N-dimethylformamide, and N,N-dimethylacetoamide; sulfoxides, such as dimethyl sulfoxide; ethers, such as tetrahydrofuran, dioxane, ethylene glycol monomethyl ether; esters, such as methyl acetate, ethyl acetate, and butyl acetate; aliphatic halogenated hydrocarbons, such as chloroform, methylene chloride, dichloroethylene, carbon tetrachloride, and trichloroethylene; and aromatic compounds, such as benzene, toluene, xylene, ligroin, monochlorobenzene, and dichlorobenzene.

The organic film 9 of such a dye or its composition may be formed by a known coating method, such as dip coating, spray coating, spinner coating, bar coating, roller coating, blade coating and curtain-flow coating from a coating composition as described above. The thickness of the organic film may generally be 500–2000Å, preferably around 1000Å. More specifically, a rather thin film is preferred in respect of the recording sensitivity and a rather thick film is preferred in respect of the reproduction S/N ratio. The optimum thickness can vary to some extent depending on the material for the organic film used.

The base member 5 for protection and easiness of handling may be composed of any material which has been used for such purpose, particularly for constituting a card base. Examples of such a material may include: polyvinyl chloride, vinyl chloride-vinyl acetate copolymer, polyvinylidene chloride, acrylic polymers such as polymethyl methacrylate, polystyrene, polypropylene, polycarbonate, epoxy resin, and acrylonitrilebutadienestyrene copolymer. As the case may be, a sheet of metal such as iron, stainless steel, aluminum, tin, copper or zinc, synthetic or natural paper, etc. can be used for the base member 5. It is further possible to use a laminate of the above materials. The base member 5 may be subjected to a pretreatment for improvement of adhesiveness, such as corona discharge treatment, plasma treatment, and primer coating.

The adhesive layer 4 may for example be composed of a hot melt-type resin, such as ethylene-vinyl acetate copolymer, ethylene-ethyl acrylate copolymer, vinyl acetate-acrylate copolymer, and polyimide resin. Thermocuring type, photocuring type or photo-thermal-curing type adhesive can deteriorate the optical recording layer 4 and is not suitably be applied entirely over the optical recording layer 4 for entire surface bonding but can be used for local bonding or for entire surface bonding after the optical recording layer has been coated with a protective film. The adhesive can be a known one and need not be particularly limited.

The laser light 10 may have different wavelengths depending on the source but the wavelength is required to be absorbable by the optical recording layer 4. Further, the laser light 10 should preferably have a short wavelength, be capable of irradiating a large area and have a uniform energy. Preferred examples of the laser light source include excimer lasers containing XeF (351 nm), $N_2$ (337 nm), XeCl (308 nm), KrF (248 nm), KrCl (222 nm), ArF (193 nm), etc. Further, in the case of forming a tracking groove by scanning of a beam spot, it is also possible to use a semiconductor laser, a $CO_2$ laser, a YAG laser, etc., after condensing the beam spot to a desired diameter (tracking groove width).

The mask substrate 11 constituting a mask as shown in FIGS. 4B, 5B and 8C(2) may comprise a material having a high transmittance with respect to the laser light used, thus not absorbing the laser light. The substrate 11 can comprise either an organic or inorganic material. The organic material may for example be acrylic resin, polyester, imide resin and polycarbonate. The inorganic material may for example be quartz glass, blue plate glass or silicon substrate.

The masking member or film 12 may preferably comprise a material absorbing the laser light used, thus showing little transmittance to the laser light. Examples of such a material may include Cr, Ni, Al, TiN and NiCr. It is possible to increase the resolving power by forming a reflection preventing layer on the masking film.

As described hereinabove, according to the process for producing an optical recording medium of the invention, the optical recording layer comprising an organic film is provided with a tracking groove without using a stamper. Further, the optical recording layer is formed on a flat substrate, so that it is formed in a uniform thickness, thus providing a stable recording sensitivity. Further, the tracking groove thus obtained provides a high reflective contrast (as defined hereinbefore) relative to the optical recording part, thus allowing stable tracking.

Hereinbelow, the present invention will be explained more specifically based on the Examples.

EXAMPLE 1

A 0.4 mm-thick substrate of polymethyl methacrylate (hereinafter abbreviated as "PMMA") was coated with a coating solution of 2.7 wt. parts of a polymethine compound, 1,1,5,5-tetrakis(p-diethylaminophenyl)-2,4-pentadienium perchlorate, in 97.3 wt. parts of diacetone alcohol by the direct gravure process, followed by drying to form an about 900Å-thick organic film as an optical recording layer.

The optical recording layer was irradiated with KrF laser light through a mask disposed in contact with the optical recording layer as shown in FIG. 4B. The mask used at this time was one comprising a Cr masking film on a quartz substrate. The laser power was about 170 mJ for an area of 5 mm×30 mm and a distance of 300 mm. As a result, the portion of the optical recording layer irradiated with the laser light was scattered to form a pattern including a 2.5 $\mu$m-wide tracking groove and a 9.5 $\mu$m-wide optical recording part.

Then, a 0.3 mm-thick PMMA base sheet or film was applied by the medium of a 0.05 mm-thick thermoplastic adhesive layer of ethylene-vinyl acetate copolymer on the optical recording layer provided with the tracking groove to obtain an optical recording medium.

The optical recording medium was subjected to data writing by using a semiconductor laser with an oscillation frequency of 830 nm to illuminate the optical recording part with spot of 1.5 μm diameter through the substrate at a recording power of 6 mW and a recording frequency of 2 MHz. Then, the recorded data were reproduced at a reading power of 0.8 mW and the reproduction waveform was subjected to spectrum analysis (scanning filter band width 30 KHz), whereby the C/N ratio was measured to be 0.54.

The tracking groove and the optical recording part showed reflectivities of about 5% and 15%, respectively, with respect to the reproduction laser light. Further, the tracking groove and the optical recording part gave a reflective contrast of 0.65, thus providing a sufficiently accurate tracking signal.

EXAMPLE 2

A 0.4 mm-thick PMMA substrate was coated with a coating solution of 2.7 wt. parts of the same polymethine compound as used in Example 1 in 97.3 wt. parts of diacetone alcohol by the direct gravure process, followed by drying to form an about 900Å-thick organic film as an optical recording layer.

The optical recording layer was irradiated with KrF laser light through a mask disposed with a spacing of 10 μm from the optical recording layer as shown in FIG. 5B(1). The mask used at this time was one comprising a Cr masking film on a quartz substrate and disposed so that the Cr film faced the optical recording layer. The laser power was about 170 mJ for an area of 5 mm×30 mm and a distance of 300 mm. As a result, the portion of the optical recording layer irradiated with the laser light was scattered to form a pattern including a 2.5 μm-wide tracking groove and a 9.5 μm-wide optical recording part.

Then, a 0.3 mm-thick PMMA base sheet was applied by the medium of a 0.05 mm-thick thermoplastic adhesive layer of ethylene-vinyl acetate on the optical recording layer provided with the tracking groove to obtain an optical recording medium.

The optical recording medium was subjected to data writing by using a semiconductor laser with an oscillation frequency of 830 nm to illuminate the optical recording part with a spot of 1.5 μm diameter through the substrate at a recording power of 6 mW and a recording frequency of 2 MHz. Then, the recorded data were reproduced at a reading power of 0.8 mW and the reproduction waveform was subjected to spectrum analysis (scanning filter band width 30 KHz), whereby the C/N ratio was measured to be 0.52. The tracking groove and the optical recording part gave a reflective contrast of 0.64, thus providing a sufficiently accurate tracking signal.

EXAMPLE 3

A 0.4 mm-thick PMMA substrate was coated with a coating solution of 3 wt. parts of the same polymethine compound as used in Example 1 in 97 wt. parts of dichloroethane by spinner coating, followed by drying to form an about 1000Å-thick organic film as an optical recording layer.

The optical recording layer was irradiated with interference fringes of ArF laser light having a wavelength of 193 nm and having passed through an interference system as shown in FIG. 7. The laser power at this time was about 170 mJ/30 cm for an area of 5 mm×30 mm. As a result, a pattern with grooves of 2.5 μm in width and 12 μm in spacing between adjacent grooves was formed on the substrate.

Then, a 0.3 mm-thick PMMA base sheet was applied by the medium of a 0.05 mm-thick thermoplastic adhesive layer of ethylene-vinyl acetate copolymer on the optical recording layer provided with the tracking groove to obtain an optical recording medium.

The optical recording medium was subjected to data writing by using a semiconductor laser with an oscillation frequency of 830 nm to illuminate the optical recording part with a spot of 1.5 μm diameter through the substrate at a recording power of 6 mW and a recording frequency of 2 MHz. Then, the recorded data were reproduced at a reading power of 0.8 mW and the reproduction waveform was subjected to spectrum analysis (scanning filter band width 30 KHz), whereby the C/N ratio was measured to be 0.5. Further, the tracking groove and the optical recording part gave a reflective contrast of 0.69, thus providing a sufficiently accurate tracking signal.

EXAMPLE 4

A 0.4 mm-thick PMMA substrate was coated with a coating solution of 6 wt. parts of the same polymethine compound as used in Example 1 in 94 wt. parts of diacetone alcohol by roller coating, followed by drying to form an about 2000Å-thick organic film as an optical recording layer.

The optical recording layer was irradiated with one shot of interference fringes of KrF laser light having a wavelength of 248 nm and having passed through an interference system as shown in FIG. 7. The laser power was about 120 mJ/30 cm for an area of 5 mm×30 mm. As a result, a optical recording layer pattern with grooves of 2.5 μm in width, 12 μm in spacing and 1000Å in depth was formed on the substrate.

The substrate with the optical recording layer pattern was formed into an optical recording medium, and subjected to recording and reproduction tests in the same manner as in Example 1, whereby a C/N ratio of 0.55 was obtained. The optical recording part and the tracking groove gave a difference in height of about 1000Å, and the ratio $R(d_2)/R(d_1)$ was 0.5. Further, the optical recording part and the tracking groove showed a reflective contrast of 0.51.

What is claimed is:

1. A process for producing an optical recording medium, comprising the steps of:
   forming an optical recording layer on a substrate, said optical recording layer comprising an organic film having dispersed therein a dye that exhibits absorptivity to light having a wavelength in a range of from 650–900 nm; and
   irradiating the optical recording layer with laser light from an excimer laser having an emission wavelength shorter than 650 nm to scatter the irradiated portion of the optical recording layer and form a tracking groove thereat while leaving dye-containing regions of the optical recording layer available for optical recording by a semiconductor laser along the tracking groove.

2. A process according to claim 1, wherein the organic film is irradiated with the laser light through a mask having a tracking groove pattern.

3. A process according to claim 2, wherein the optical recording layer is irradiated with the laser light through the mask disposed in contact with the optical recording layer.

4. A process according to claim 2, wherein the organic film is irradiated with the laser light through the mask disposed with a spacing from the optical recording layer.

5. A process according to claim 2, wherein the organic film is irradiated with the laser light through the mask disposed on the side of the substrate opposite to the side having the organic film.

6. A process according to claim 1, wherein the organic film is irradiated with the laser light which has been patterned through optical interference.

7. A process according to claim 1, wherein the organic film after the laser irradiation is covered with a protecting base by the medium of an adhesive layer.

8. A process according to claim 1, wherein the optical recording layer before the laser irradiation is covered with a protective base and then subjected to the laser irradiation.

9. A process according to claim 1, wherein the optical recording layer has a thickness of 500–2000Å.

10. A process according to claim 9, wherein the optical recording layer has a thickness of 800–1200Å.

11. A process according to claim 1, wherein the optical recording part and the tracking groove show reflectivities $R(d_1)$ and $R(d_2)$, respectively, satisfying the relationship of $0.3 \leq R(d_2)/R(d_1) \leq 0.7$.

12. A process according to claim 1, wherein the tracking groove has been formed by complete removal of the organic film at the irradiated portion.

13. A process according to claim 1, wherein the optical recording part and tracking groove provide a reflective contrast of 0.45 or higher.

14. A process according to claim 1, wherein the optical recording medium is in the form of a card.

15. A process according to claim 1, wherein said organic dye is a polymethine dye.

16. A process for producing an optical recording medium, comprising the steps of:
   forming an optical recording layer on a substrate, said optical recording layer comprising a polymethine dye and exhibiting absorptivity to light having a wavelength in a range of from 650–900 nm; and
   irradiating the optical recording layer with laser light from an excimer laser having an emission wavelength shorter than 650 nm to scatter the irradiated portion of the optical recording layer and form a tracking groove thereat while leaving dye-containing regions of the optical recording layer available for optical recording by a semiconductor laser along the tracking groove.

* * * * *

UNITED STATES PATENT AND TRADEMARK OFFICE
CERTIFICATE OF CORRECTION

PATENT NO. : 5,248,990  Page 1 of 2
DATED : September 28, 1993
INVENTOR(S) : ISHIKAWA, ET AL.

It is certified that error appears in the above-indentified patent and that said Letters Patent is hereby corrected as shown below:

On title page, Item
[30] FOREIGN APPLICATION PRIORITY DATA:

"61-092087" should read --62-092087--;
"61-101814" should read --62-101814--;
"61-104676" should read --62-104676--; and
"61-140083" should read --62-140083--.

COLUMN 1:

Line 67, "as" should read --,--.

COLUMN 2:

Line 50, "simplar" should read --simpler--.

COLUMN 3:

Line 14, "respectively," should read --are, respectively,--;
Line 19, "and" should be deleted; and
Line 42, "the at" should read --the reflectivity at--.

COLUMN 5:

Line 47, "use" should read --use in--; and
Line 53, "un-recorded" should read --unrecorded--.

UNITED STATES PATENT AND TRADEMARK OFFICE
CERTIFICATE OF CORRECTION

PATENT NO. : 5,248,990
DATED : September 28, 1993
INVENTOR(S) : ISHIKAWA, ET AL.

It is certified that error appears in the above-indentified patent and that said Letters Patent is hereby corrected as shown below:

COLUMN 6:

Line 36, "quenches" should read --quenchers--.

COLUMN 7:

Line 63, "is" should read --can--.

Signed and Sealed this

Fourteenth Day of June, 1994

Attest:

BRUCE LEHMAN

Attesting Officer        Commissioner of Patents and Trademarks